N. K. WILCOX.
TRACTOR.
APPLICATION FILED DEC. 27, 1915.

1,258,512.

Patented Mar. 5, 1918.
5 SHEETS—SHEET 1.

INVENTOR;
NEWTON KINCAID WILCOX,
BY
Albert H. Baker,
ATT'Y

N. K. WILCOX.
TRACTOR.
APPLICATION FILED DEC. 27, 1915.

1,258,512.

Patented Mar. 5, 1918.
5 SHEETS—SHEET 4.

INVENTOR;
NEWTON KINCAID WILCOX
BY Albert H Baker
ATT'Y

UNITED STATES PATENT OFFICE.

NEWTON KINCAID WILCOX, OF PROVIDENCE, RHODE ISLAND.

TRACTOR.

1,258,512.     Specification of Letters Patent.     Patented Mar. 5, 1918.

Application filed December 27, 1915. Serial No. 68,640.

*To all whom it may concern:*

Be it known that I, NEWTON KINCAID WILCOX, a citizen of the United States, residing at Providence, in the county of Providence and State of Rhode Island, have invented a certain new and useful Improvement in Tractors, of which the following is a full, clear, and exact description, reference being had to the accompanying drawings.

The general object of this invention is to provide a simple, efficient tractor, useful for many purposes and adaptable for a great variety of conditions. My invention is particularly useful for agricultural purposes, although it may be used to great advantage for any traction purpose.

In carrying out my invention I provide a frame, narrow in comparison to its length, supported on longitudinally alined wheels, one of which is the driving or traction wheel and another of which is the steering wheel. The frame carries a suitable motor and driving mechanism connecting the motor with the traction wheel. To maintain the tractor, thus supported on the alined wheels, in an upright position, I provide a laterally extending arm at the outer end of which is mounted a wheel adapted to run on ground. This arm is so attached to the tractor as to prevent any relative vertical movement of the wheel at the end thereof with relation to the tractor, and the combined weight of the wheel and arm is sufficient to prevent the tractor tipping in a direction away from this wheel, while the rigidity of the arm prevents the tractor tipping toward this wheel.

Another object of the invention is to provide for readily changing the position of this laterally extending arm and stabilizing wheel from one side of the tractor frame to the other. A more specific object is to provide means for varying the distance between the path of the stabilizing wheel and the path of the alined wheels, so that the stabilizing wheel may run in a path very close to that of the alined wheels, or may be separated therefrom at any suitable distance.

Still another object of the invention is to cause the laterally extending arm to clear obstructions between the path of the alined wheels and the path of the stabilizing wheel. This I accomplish by providing an upwardly extending arched portion in the outstanding arm, which arch may, for example, pass freely over rows of grape-vine stumps, young corn stalks, celery, sugar beets, and like obstructions. Still another object is to so construct the arm as to allow for varying the width, height and lateral position of the arched portion of the arm.

Still another object is to maintain the frame and alined wheels in their normal upright position while the alined wheels are running on a different level of ground than the stabilizing wheel. This I accomplish by so attaching the arm to the frame that the stabilizing wheel may be moved upwardly and downwardly with relation to the alined wheels.

Some of the important features of my invention are as follows: The alined wheels may run in a narrow row or path which is very desirable when used for agricultural purposes, for this permits the vehicle to pass between rows of growing vegetables while the stabilizing wheel may run in an adjacent parallel row without coming in contact with the intervening plants; the shifting of the stabilizing wheel from one side of the alined wheels to the other permits the tractor to be used for pulling cultivating implements very close to fences, rows of trees, stumps and the like, at either side of the alined wheels; the traction wheel and steering wheel, being in alinement and mounted in a rigid frame, provides for the most convenient attachment of the implement to be drawn by the tractor, at a point in alinement with these wheels, thus providing a direct pull in the path of the traction wheel, which secures the most efficient use of the tractor's power as well as greatly facilitating the steering of the tractor.

My invention is hereinafter more fully described in connection with the accompanying drawings and the essential characteristics of my invention are summarized in the claims.

Referring to the drawings.

Referring to the drawings by reference numerals, the frame proper of my tractor is a long narrow structure comprising two side frame members 1 and 2, braced at each end by transverse members 3 and 4. These frame members are preferably formed of channel bars with the flanges turned outwardly and are secured together at the corners by suitable bracing devices as shown. Near the rear portion of this frame, and between the side members, is mounted a traction wheel 10, having its shaft 11 extending outwardly beneath the members of the frame to suitable bearing boxes 12, secured to the under side of the frame members, as shown. At the forward end of the tractor is a steering wheel indicated at 15, so mounted as to have its plane of rotation changed with relation to the frame, for steering the tractor, as will be hereinafter described. The steering wheel 15 is in longitudinal alinement with the traction wheel 10 and preferably runs normally in the middle of the path of the traction wheel.

At 20 is indicated a motor suitably carried on the frame and shown as having lateral extensions of its crank shaft 21 extending transversely of the frame and bearing in suitable boxes indicated at 23, and having at one side a fly-wheel 24, preferably at the inner side of the frame member 1. Near the other side frame member may be provided a sprocket wheel 25 on the engine shaft, over which runs a sprocket chain 26 adapted to drive a larger sprocket wheel 27 on a transverse shaft 28, preferably operatively connected through an alined shaft 29 with speed change gears, which may be mounted in a suitable casing indicated at 30. The shaft 28 may be connected with the shaft 29 through a suitable clutch indicated at 32, shown as operated by a bell-crank 33, which may be controlled by the operator through mechanism not shown. A small sprocket wheel indicated at 35 and preferably driven by the change gears, may serve to drive a sprocket chain 36 running over a comparatively large sprocket wheel 40, mounted on the shaft 11 and rigidly connected with the wheel 10, for driving this traction wheel. The purpose of the change gears, which may be used, is to provide for two or more speeds forward as well as for reversing the tractor, and they may be operated by any suitable means. At 34 is indicated a bell crank, shown as connected with a member extending into the change gear casing for operating such gears.

While the motor may be of any suitable type, I have shown an internal combustion motor requiring a water cooling system. Accordingly, I provide a suitable radiator, indicated at 45, mounted above the forward end of the frame and shown as connected with the water jacket of the motor through tubes 46 and 47.

Figure 4:
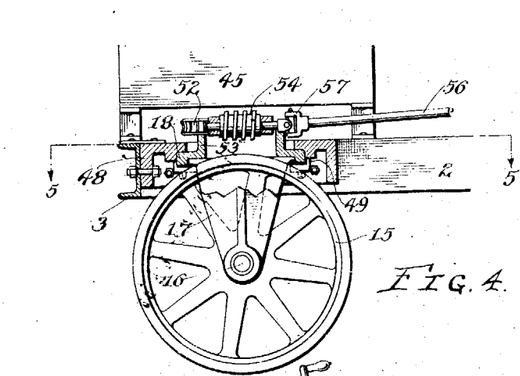
Fig. 4 is a vertical transverse section showing the steering wheel and operating mechanism.
Figure 5:
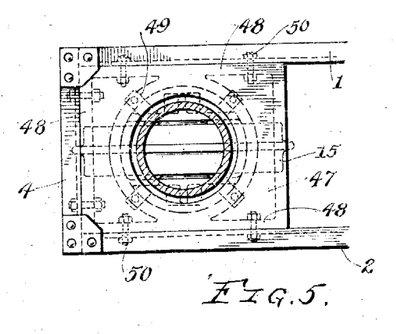
Fig. 5 is a horizontal section at the front end of the tractor showing the manner in which the steering wheel is mounted, the plane of the section being indicated by the line 5—5 of Fig. 4.

The wheel 15 is shown as having its shaft 16 journaled in downwardly extending bracket arms 17 rigid with an outwardly extending flange member 18 rotatably engaging a rabbet formed in the lower side of the plate 47, shown as integral with downwardly extending flanges 48, fitting between the webs of the side members 1 and 2 and against the forward cross member 4. At 50 are indicated bolts which pass through these flanges and the webs of the frame members, for securely holding this bearing member in position. Clamps shown at 49 as engaging beneath the flange 18 hold it in engagement with the rabbet. Shown as carried above the plate 47 is a worm gear 52 formed on a portion 53 extending upwardly from the flange 18. A worm 54 engaging the teeth of the worm gear and mounted in bearings 55 may be rotated by a shaft 56, connected with the worm shaft through a universal joint 57, and adapted to be turned by a hand wheel 58. The rod 56 is shown as extending rearwardly and the hand wheel 58 is preferably positioned where it may be reached by the operator at the rear of the tractor. At 60 is indicated a seat for the operator, preferably carried on a spring arm 61.

It will be seen that by rotating the wheel 58, the worm 54 will be rotated, which will in turn rotate the gear 52, turning the steering wheel 15 either to the right or to the left. This wheel is preferably so mounted that it may turn to a position substantially at right angles to the normal direction of travel.

Figure 1:
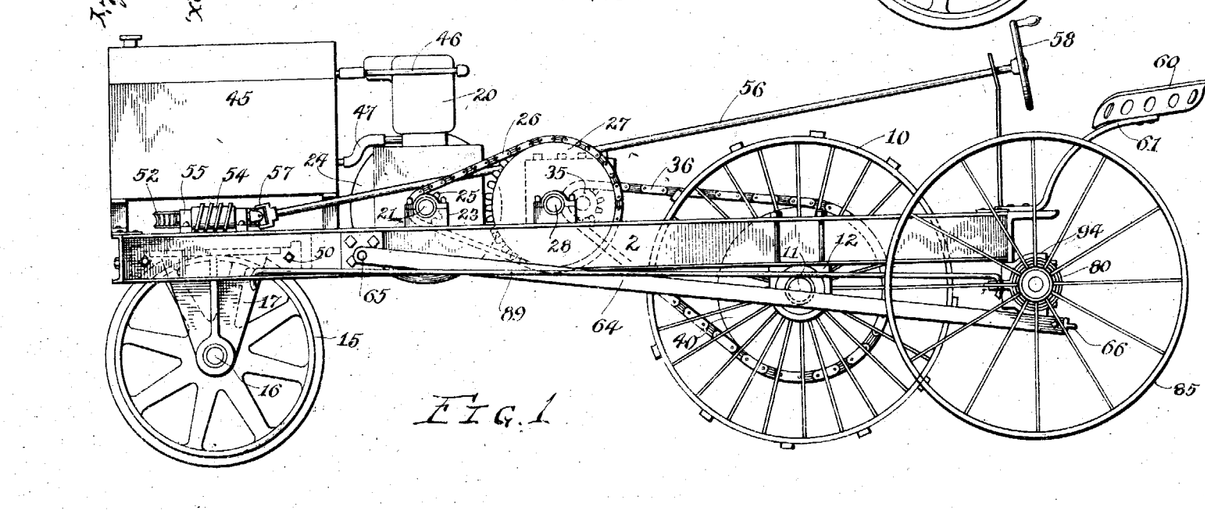
Figure 1 is a side elevation of my tractor.
Figures 2, 3:
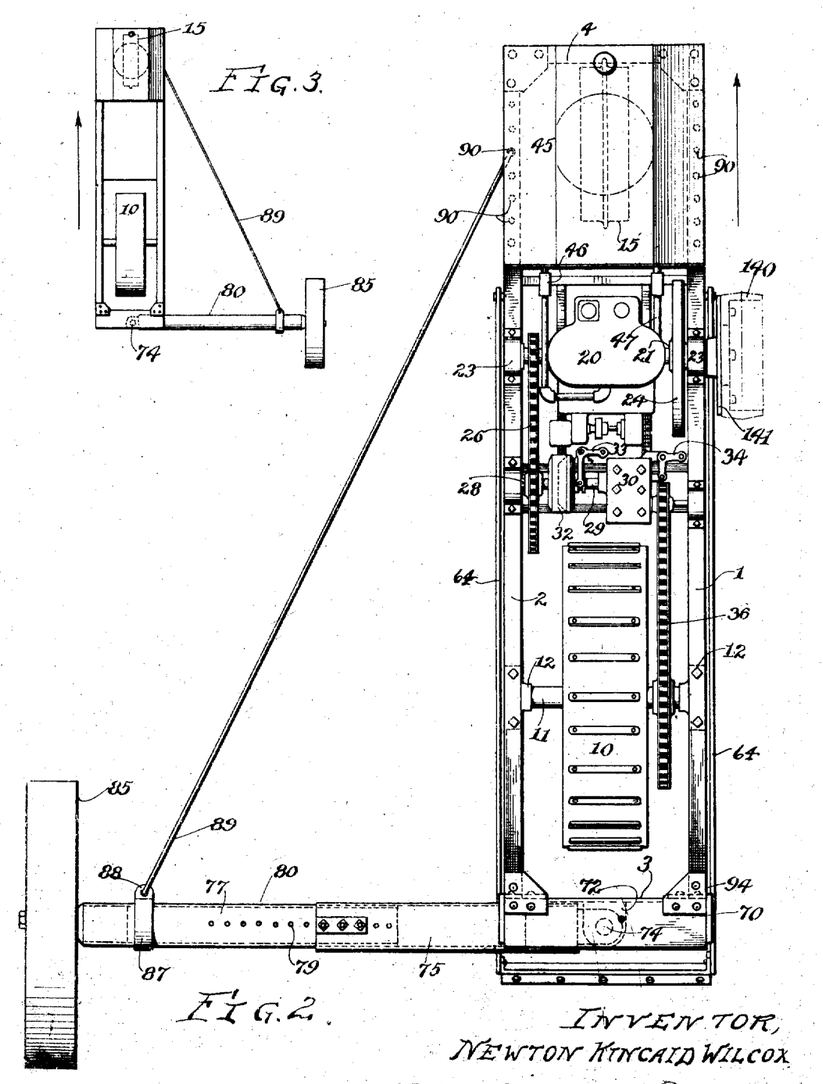
Fig. 2 is a plan of the same, some of the parts being omitted for clearness.
Fig. 3 is a conventional plan on a reduced scale, showing the stabilizing wheel and axle arm positioned at the side of the tractor, opposite that shown in Fig. 2.
Figure 6:
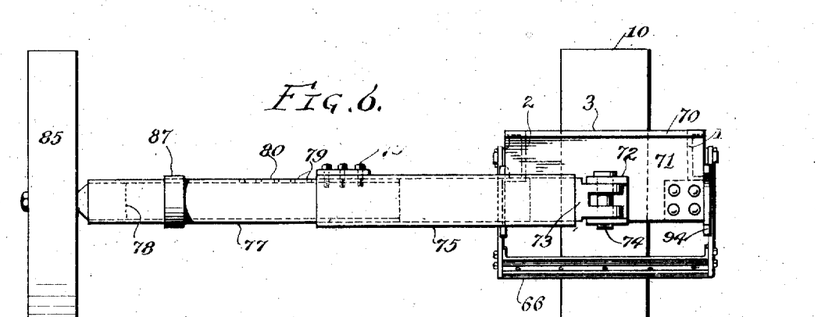
Fig. 6 is a rear view of the tractor frame showing the stabilizing wheel and arm.

The construction of the stabilizing arm of the form illustrated particularly in Figs. 2 and 6, will now be described.

The transverse member 3 of the frame is preferably a comparatively large transverse angle bar having flanges 70 and 71, the latter shown as extending downwardly past the frame members 1 and 2 and carrying on the rear of its vertical flange 71 an outwardly extending clevis 72 adapted to embrace the sides of a bifurcated head 73 pivoted in the clevis 72 by a pin 74. The head 73 is provided with a cylindrical shank adapted to be firmly secured within a tubular member 75 forming a portion of the outstanding arm 80, at the end of which is journaled a stabilizing wheel 85. Fitting within the tube 75 is a second tube 77, which receives at its outer end a block 78 formed rigid with an outwardly extending bearing for the wheel 85. The tubes 75 and 77 are adapted to telescope one into the other, to provide for varying the distance between the path of the wheels 15 and 10 and the path of the wheel 85. The tube 77 may be moved into and out of the tube 75 and be secured in any desired position by inwardly extending bolts 76 adapted to engage threaded openings 79 in the tube 77.

Near the outer end of the tube 77 is a clip 87 surrounding the tube and having forwardly extending ears 88 adapted to be engaged by the downwardly hooked portion of a rod 89. The rod extends diagonally toward the frame and has at its forward end a downwardly hooked portion which may engage any one of a series of separated holes 90, shown as provided through the upper flange of the side members 1 and 2. As the tubes 75 and 77 are telescoped to vary the length of the arm, it is necessary to hold the arm at its proper position (that is at right angles to the path of the alined wheels), by changing the forward end of the rod 89 from one of the holes 90 to another. It will be readily seen that by merely unhooking the rod 89 the arm 80 may be swung rearwardly about the pin 74 as an axis, until the arm takes a position substantially at right angles to the path of the steering and traction wheels at the opposite side of such path. The conventional view shown in Fig. 3 illustrates such a position of the arm and stabilizing wheel with the bracing rod 89 in the corresponding position.

Figure 8:
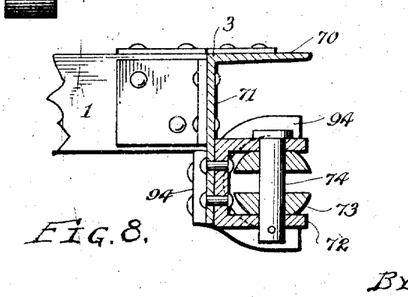
Fig. 8 is a vertical sectional detail showing the means for pivotally attaching the stabilizing arm to the frame.

To provide separated points of attachment for the arm, thereby securing rigidity, I have shown lock-members or clips 94 (Figs. 6 and 8), secured to the back of the angle plate flange 71 and extending rearwardly across the end thereof and having a bifurcated portion adapted to embrace the exterior of the tube 75. As there is one of these members at each end of the flange 71, the outstanding arm is engaged at longitudinally separated points, that is, at its pivot and by the projections of the members 94, whether extending at the right or left side of the frame.

The tractor may be connected with any implement to be drawn thereby, such as a plow, a cultivator or the like, by any suitable means. For this purpose I have shown at each side of the frame a flat bar 64 pivoted to the forward portion of the frame at 65 and extending downwardly and rearwardly and connected by a T-bar cross member 66 shown as provided with suitable openings 67 (Fig. 7), through the rearwardly projecting flange, for the convenient attachment of an implement to be drawn. While this means for attaching the implement to be drawn is advantageous, as it tends to pull downwardly on the forward portion of the frame, if desired the implement may be attached to the pivot pin 74 between the bearing portions of the bifurcated head 73.

Figure 7:
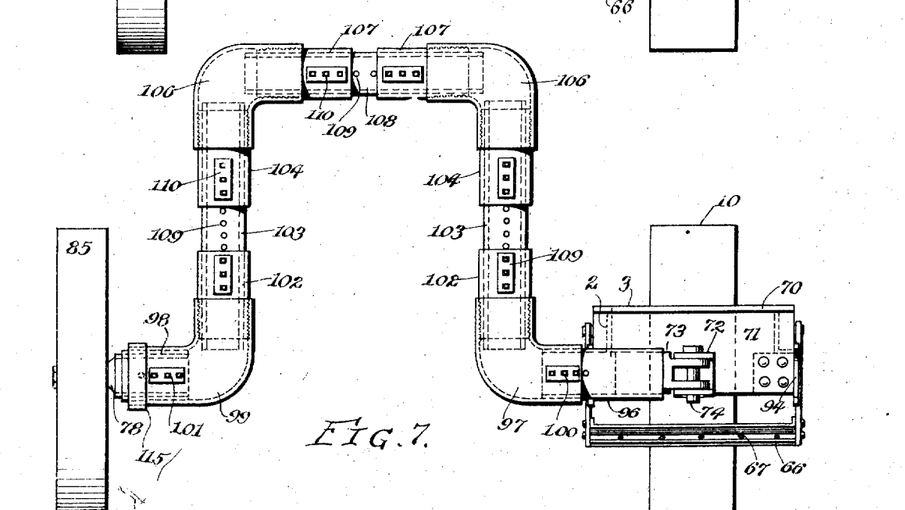
Fig. 7 is a similar view of a modified construction of the out-standing arm for the stabilizing wheel showing the arched portion adapted to clear obstructions between the paths of the alined wheels and the out-standing wheel.
Figure 9:
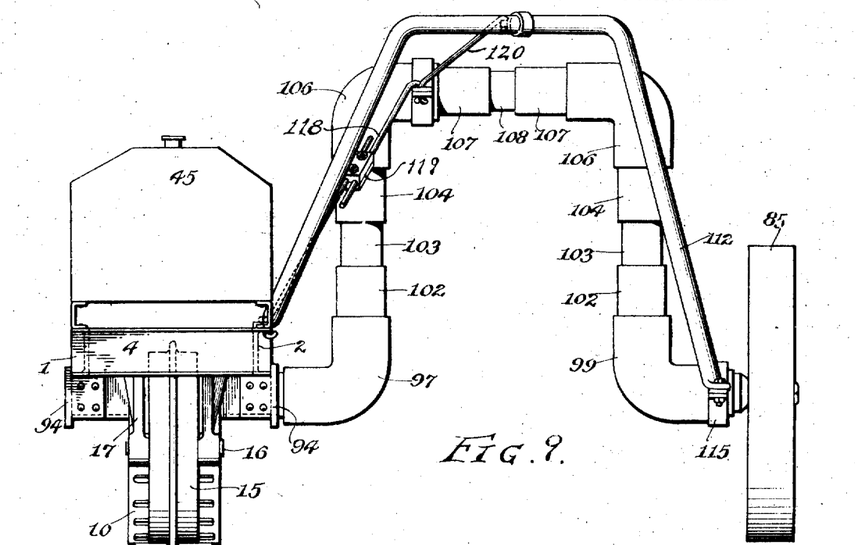
Fig. 9 is a front elevation of the tractor showing a means for bracing the outstanding arm.

In order that the stabilizing wheel 85 may run in a path separated from the path of the alined wheels by rows of growing plants or other obstructions, without the arm encountering such obstructions, I may provide an upwardly offset portion in the laterally projecting arm, as shown particularly in Figs. 7 and 9. The head 73 engaging the pivot pin 74 is shown in this form of arm as rigidly carried in a short tube 96, which is adjustably carried in one portion of an upwardly turned elbow 97. The block 78 carrying the journal for the wheel is shown as carried in a tube 98, which is longitudinally adjustable in an upwardly turned elbow 99, similar to the elbow 97. At 100 and 101 are indicated screws similar to the screws 76 and adapted to clamp the elbows 97 and 99 in position over the members 96 and 98. The elbows 97 and 99 carry tubes 102 threaded therein, which in turn embrace tubes 103, which are embraced by tubes 104 threaded into the downwardly extending portion of elbows 106. The elbows 106 are connected by tubes 107 threaded into the elbows, and a tube 108 engaging the interior of the tubes 107. The tubes 103 and 108 may be provided with openings 109 which may receive screws 110, for securing these tubes in any desired relative position. Thus the tubes forming the inverted U-shaped portion of the outstanding arm may conveniently be longitudinally adjusted.

It will be seen that by the use of the above construction the inverted U-shaped arch in the outstanding arm may be adjusted laterally along the arm. The upstanding portions of the U may be lengthened or shortened, thereby raising the connecting portion, and the width of the U may be varied by sliding the tubes 107 toward or away from each other along the tube 108. Furthermore, the overall length of the arm may be varied.

Figure 10:
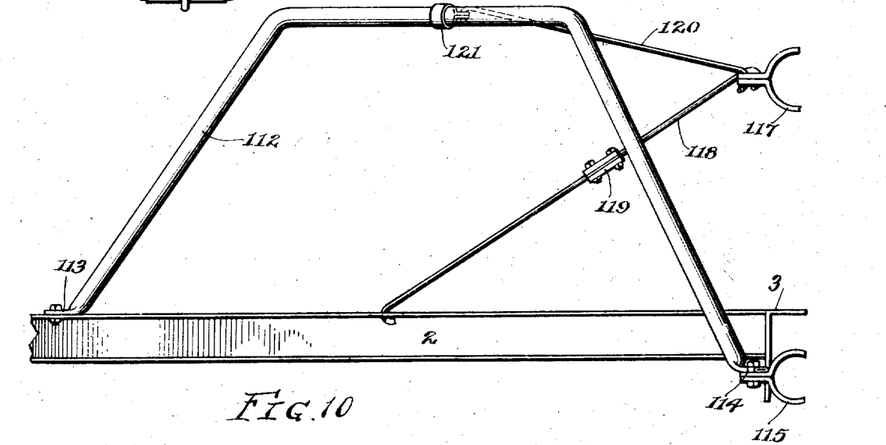
Fig. 10 is a detail view of the bracing mechanism looking from the right in Fig. 9.

When the arched arm is used it is desirable to brace the outer end of the arm, as described in connection with the straight arm 80, but it is necessary that the brace should not impinge the obstructions which the arched portion of the arm is designed to clear. In Figs. 9 and 10 is shown an upwardly arched brace 112, preferably comprising a tubular member having its ends flattened as at 113 and 114 and each extending in a horizontal plane. These flattened portions 113 and 114 preferably have only one opening through which may extend a suitable bolt for securing them to the upper flange of the side member of the frame and the clip 115 carried at the outer end of the arm. As the upwardly extending portions of the arm and the connecting portion stand substantially in the same plane it is obvious that this brace may be used equally well with the arm at either side of the frame of the tractor. To further steady the upper portion of the arch I may provide a clip 117, shown as extending around the inner elbow 106, and connected with this clip is a brace 118 extending downwardly to the upper flange of the frame member. The brace 118 preferably comprises two parts embraced by suitable adjusting clamps 119, allowing the upper portion of the arch to be raised and lowered. A second brace 120 may extend from the clip 117 to a clip 121, engaging the intermediate portion of the brace 112 and adapted to be adjusted longitudinally along the same.

Figure 11:
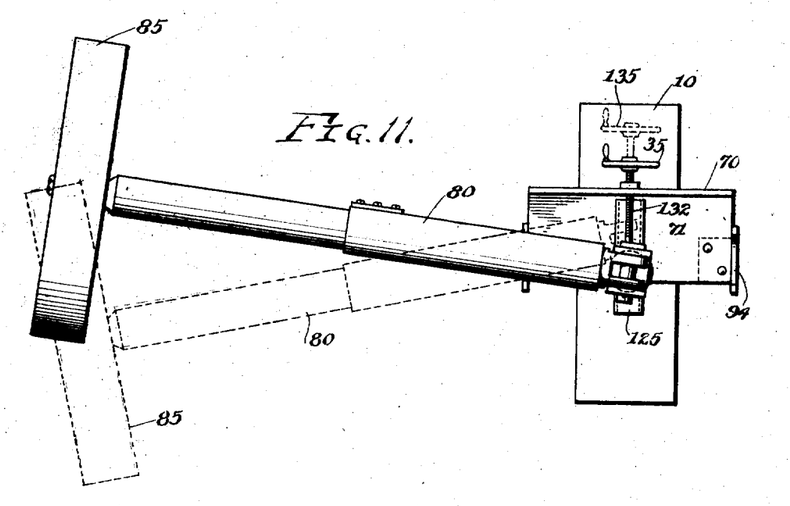
Fig. 11 is a view similar to Fig. 6, illustrating the means for varying the relative height of the stabilizing wheel.
Figures 12, 13:
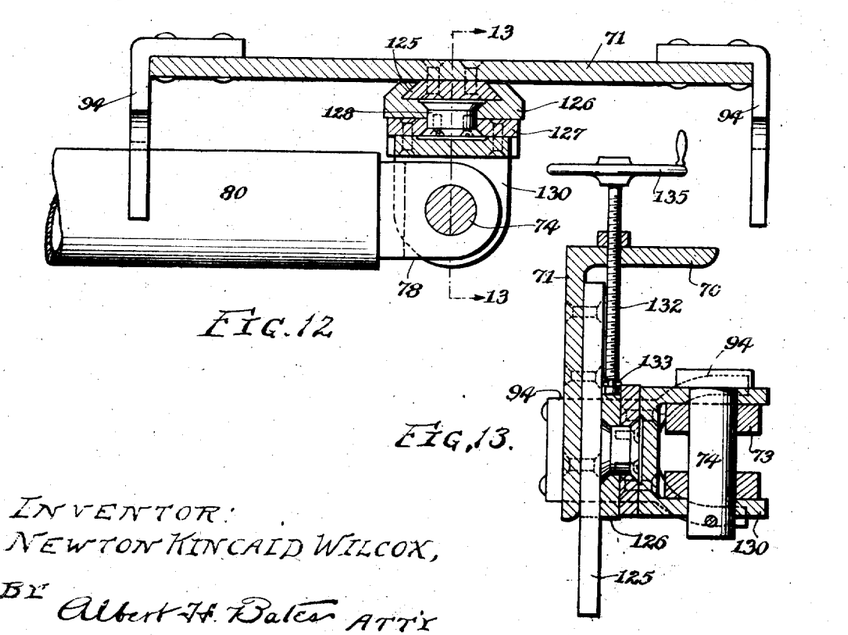
Fig. 12 is a horizontal section through the pivoting device showing the arm in a horizontal position.
Fig. 13 is a vertical section taken substantially on the line 13—13 of Fig. 12.

In Figs. 11, 12 and 13 I have shown a construction adapted to be used with the outstanding arm, either the arched arm or the straight arm, for the purpose of raising or lowering the stabilizing wheel 85 so that the alined wheels and frame carried thereby may be maintained in their normally upright position, while such alined wheels are running on ground at a different level than that of the stabilizing wheel, as for example, when operating the tractor on a hillside or with the alined wheels in a plowed furrow while the stabilizing wheel is on the surface of the ground. The construction of this device will now be described.

Mounted in a vertical position at the rear side of the downwardly extending flange 71 of the angle bar 3 is a guide bar 125 for a dove-tailed slide 126 to which is pivoted a rotatable member 127, by means of a horizontal pin 128. The member 127 is shown as rigidly secured to a clevis 130 carrying the pivot pin 74 passing through the bifurcated head 73 for the outstanding arm 80, as in the construction heretofore described. When the arm 80 is in position at either side of the frame it engages the bifurcated members 94, as heretofore described, and accordingly if the inner end of the arm, that is the pivot end, is raised or lowered, the arm will be swung about the member 94 correspondingly lowering or raising the wheel 85.

As a means for accomplishing this raising and lowering I have shown a screw 132, threaded through the horizontal flange 70 of the angle bar 3 and having at its lower end an enlarged head 133, shown as engaging a T-slot in the upper side of the slide 126 so that the slide may be either raised or lowered by turning the screw 132 by means of a suitable crank or hand wheel 135.

It is obvious that this raising and lowering device may be used either with the straight arm or with the arched arm, and may raise or lower the stabilizing wheel whether at the right or the left side of the frame.

From the foregoing description it will be seen that I have provided a tractor accomplishing the objects set forth and having a very wide adaptability. My device may be readily and cheaply manufactured; it requires no unusual mechanical construction, is very durable and has no parts liable to get out of order. Among other advantages the following may be set forth. Many of the conditions incident to agriculture (such for example as the distance between rows of plants), have been established by the use of horses for agricultural purposes and my tractor is preferably of such size that it may readily conform to such existing conditions, and it will be apparent from the foregoing description that it may be used in practically every situation where horse-power is used, while having the additional advantage of being as powerful as many horses.

It is frequently desirable to use the motor of the tractor to furnish power for other purposes than driving the tractor, such, for example, as cutting ensilage, running threshing machines, and the like. To provide for this I have shown a disk 141 on the end of the engine shaft 21, on which may be bolted a pulley 140, shown as having an inwardly turned flange to receive the bolts. When used as a tractor the pulley 140 may be removed, allowing the tractor to be run very close to obstacles, as the disk 140 projects but a slight distance past the side of the frame.

Having thus described my invention, what I claim is:

1. In a tractor, the combination of a traction and steering wheel in longitudinal alinement, a frame carried by such wheels, an extensible arm pivotally attached to the frame having a rigid bearing at its outer end, a wheel on said bearing adapted to run in a path parallel to the path of the alined wheels, said arm and wheel being adapted to be swung about the pivot from one side of the first mentioned wheels to the other.

2. In a tractor, the combination of a pair of longitudinally alined wheels, a frame carried by said wheels, an arm attached to the frame adapted to extend therefrom at either side of the frame, a wheel journaled at the outer end of said arm, and means for changing the lateral distance between the path of said wheel and the path of the alined wheels.

3. In a tractor, the combination of a pair of longitudinally alined wheels, a frame carried by said wheels, an arm attached to the frame adapted to extend therefrom at either side of the frame, means for preventing vertical movement of the arm relative to the frame, a wheel journaled at the outer end of said arm, said arm comprising a plurality of parts longitudinally slidable, and means for clamping such parts together.

4. In a tractor, the combination of a steering and traction wheel in longitudinal alinement, a frame narrow in comparison to its length supported by such wheels, an arm pivoted to the frame, a wheel journaled at the outer end of said arm, said arm comprising a plurality of parts adapted to slide one over another to change the length thereof, and means for rigidly holding said arm in positions projecting laterally from the frame at either side.

5. In a tractor, the combination of a steering and traction wheel in longitudinal alinement, a frame supported by such wheels, an arm pivoted to the frame, a wheel journaled at the outer end of said arm, said arm comprising a plurality of parts adapted to slide one over another to change the length thereof, a brace extending from the outer end of said arm to the frame, and means for attaching said brace to the frame at different points.

6. In a tractor, the combination of alined steering and traction wheels, a frame carried by said wheels, an arm adapted to project laterally from the frame at either side, means for attaching said arm to the frame whereby it may serve to maintain the frame in an upright position, a wheel journaled at the outer end of said arm, said arm having an intermediate vertical off-set portion extending upwardly and then transversely and then downwardly between the frame and wheel and adapted to clear obstructions between the paths of the alined wheels and the wheel journaled on the arm.

7. In a tractor, the combination of alined steering and traction wheels, a frame carried by said wheels, an arm adapted to project laterally from the frame, means for attaching said arm to the frame whereby it may serve to maintain the frame in an upright position, a wheel journaled at the outer end of said arm, said arm having an intermediate upwardly extending off-set portion adapted to clear obstructions between the paths of the alined wheels and the wheel journaled on the arm, and upwardly arched bracing means extending from the outer end of the arm diagonally to the frame.

8. In a tractor, the combination of alined steering and traction wheels, a frame carried by such wheels, a motor and driving mechanism carried by the frame, a laterally extending arm secured to the frame, a wheel journaled on said arm, means for holding the arm in a laterally extending position at the side of the frame, said arm having an intermediate inverted U-shaped portion, and means for vertically adjusting a connecting portion of the U.

9. In a tractor, the combination of alined steering and traction wheels, a frame carried by such wheels, a motor and driving mechanism carried by the frame, a laterally extending arm secured to the frame, a wheel journaled on said arm, means for holding the arm in a laterally extending position at the side of the frame, said arm having an intermediate inverted U-shaped portion, and means for laterally adjusting the upstanding portions of the U.

10. In a tractor, the combination of alined steering and traction wheels, a frame carried by such wheels, a motor and driving mechanism carried by the frame, a laterally extending arm secured to the frame, a wheel journaled on said arm, means for holding the arm in a laterally extending position at the side of the frame, said arm having an intermediate inverted U-shaped portion, means for vertically adjusting a connecting portion of the U, and means for changing the lateral position of the upwardly extending inverted U portion.

11. In a tractor, the combination of alined steering and traction wheels, a frame carried by such wheels, a motor and driving mechanism carried by the frame, a laterally extending arm secured to the frame, a wheel journaled on said arm, means for holding the arm in a laterally extending position at the side of the frame, said arm having an intermediate inverted U-shaped portion, means for vertically adjusting a connecting portion of the U, means for changing the relative lateral position of the upwardly extending inverted U portion, and means for changing the overall length of the arched arm.

12. In a tractor, the combination of steering and traction wheels in longitudinal alinement, a frame narrow in comparison to its length carried by said wheels, an arm adapted to extend laterally from the frame in either direction, a wheel journaled at the outer end of said arm, an off-set portion in said arm extending upwardly and downwardly between the ends of the arm, and a brace also upwardly arched and connecting the outer portion of said arm with a forward portion of the frame.

13. In a device of the character described, the combination of alined steering and traction wheels, a frame carried by said wheels, an arm adapted to project laterally from the frame, a wheel journaled at the outer end of said arm and adapted to run in a path separated from the path of the alined wheels, said arm comprising a plurality of telescoping tubular members, and means for clamping one of the members to another.

14. In a device of the character described, the combination of alined steering and traction wheels, a frame carried by such wheels, a stabilizing arm extending laterally from the frame, a wheel journaled at the outer end of said arm and adapted to run in a path parallel to that of the alined wheels, said arm comprising a plurality of tubular members connected by intermediate elbows providing an upwardly extending arched portion adapted to clear obstructions between the paths of the alined wheels and the path of the stabilizing wheel.

15. In a tractor, the combination of a traction and steering wheel in longitudinal alinement, a frame carried by said wheels, means for preventing such frame from tipping comprising an arm adapted interchangeably to project laterally from the frame at either side, a wheel journaled at the outer end of such arm, means for attaching the arm to the frame, additional means rigidly carried by the frame for engaging the arm when it is projecting to either side of the frame, and a brace for the outer end of the arm.

16. In a tractor, the combination of alined wheels, a frame carried by such wheels, an arm adapted to interchangeably project laterally from the frame at either side, a wheel journaled at the outer end of such arm, and adjustable means for raising and lowering the outer end of the arm by changing the angle of the longitudinal portion thereof with relation to the frame.

17. In a tractor, the combination of alined wheels, a frame carried by these wheels, a stabilizing wheel, an arm projecting laterally from the frame having the stabilizing wheel journaled at its outer end, and means for attaching the arm and the frame in such a manner that it may be swung in a vertical plane transversely of the frame to raise and lower the stabilizing wheel with relation to the frame.

18. In a tractor, the combination of alined wheels, a frame carried by these wheels, a stabilizing wheel, an arm on which the stabilizing wheel is journaled adapted to project laterally from the frame, a member carried by the frame adapted to embrace said arm, a member for pivoting the arm to the frame at a point separated from the last named member, and means for vertically adjusting one of said two last mentioned members for raising or lowering the outer end of the arm.

19. In a tractor, the combination of longitudinally alined wheels, a frame carried by these wheels, an arm adapted interchangeably to project laterally from the frame at either side, means for pivoting the inner end of the arm to the frame whereby the arm may be swung from side to side, means at each side of the pivot separated therefrom for embracing the arm providing rigidity in operation, a slide carrying said pivot, and screw mechanism for raising and lowering said slide whereby the outer end of said arm may be raised and lowered, and a wheel journaled at the outer end of said arm.

In testimony whereof, I hereunto affix my signature.

NEWTON KINCAID WILCOX.